(No Model.) 2 Sheets—Sheet 1.
J. SMITH.
MACHINE FOR MAKING DROP CANDY.
No. 405,721. Patented June 25, 1889.
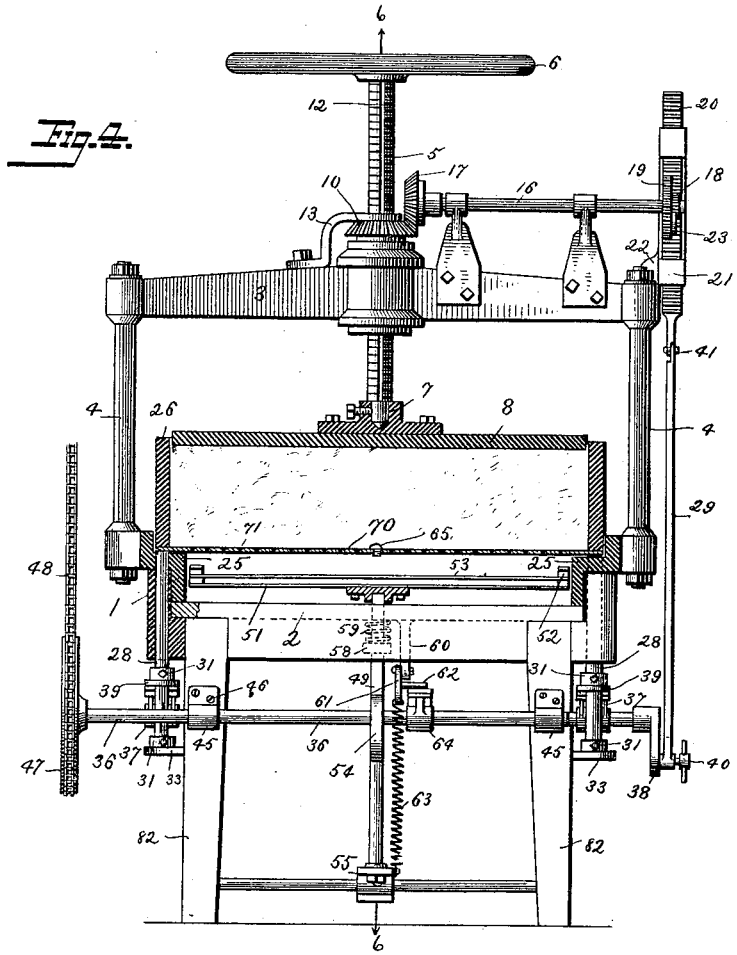
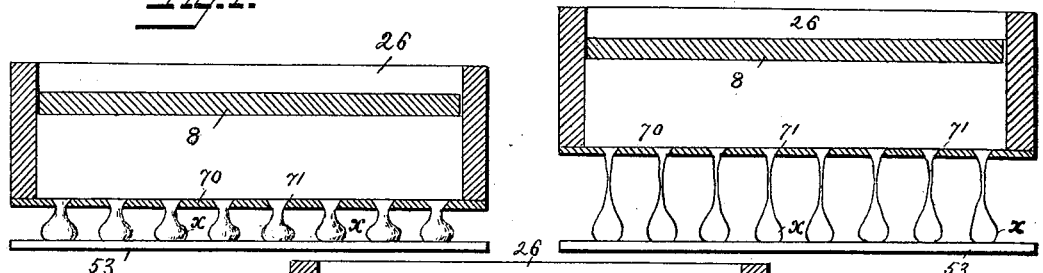
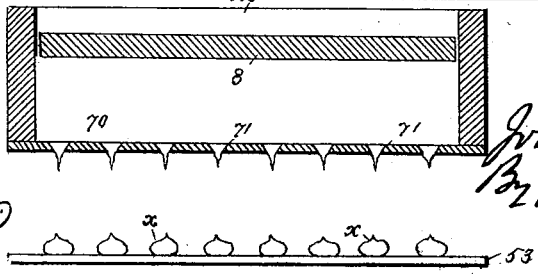
Witnesses
Jno. G. Hinkel Jr.
H. L. McArthur
Inventor
John Smith
By Peter & Freeman
Attorneys (No Model.) 2 Sheets—Sheet 2.
J. SMITH.
MACHINE FOR MAKING DROP CANDY.
No. 405,721. Patented June 25, 1889.
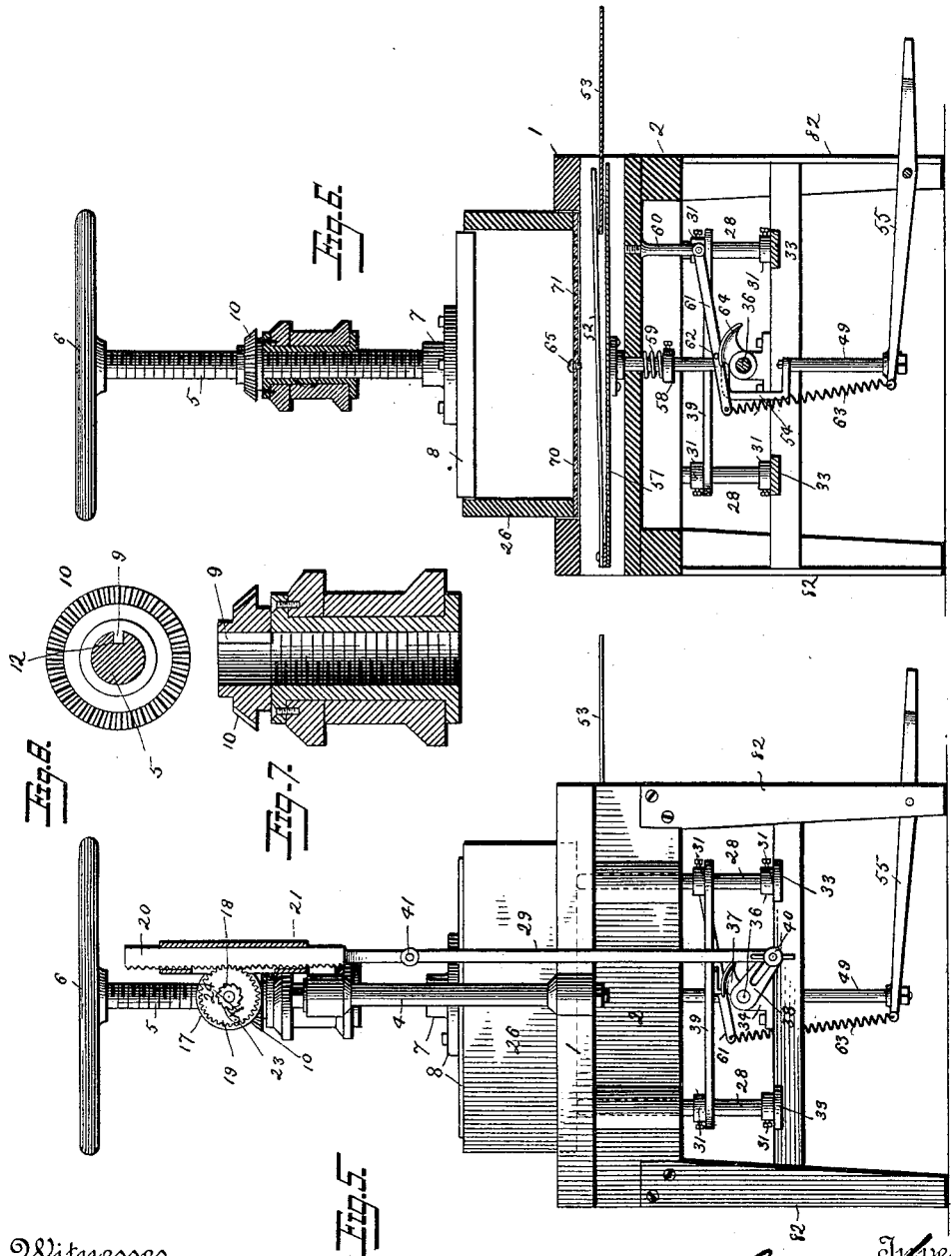

UNITED STATES PATENT OFFICE.

JOHN SMITH, OF NORRISTOWN, ASSIGNOR TO CROFT & ALLEN, OF PHILADELPHIA, PENNSYLVANIA.

MACHINE FOR MAKING DROP-CANDY.

SPECIFICATION forming part of Letters Patent No. 405,721, dated June 25, 1889.

Application filed October 29, 1888. Serial No. 289,403. (No model.)

*To all whom it may concern:*

Be it known that I, JOHN SMITH, a citizen of the United States, and a resident of Norristown, in the county of Montgomery and State of Pennsylvania, have invented certain new and useful Improvements in Machines for Making Drop-Candy, of which the following is a specification.

My invention relates to improvements in machines for dropping candies; and it consists of a machine provided with a receptacle having a perforated bottom and an adjustable follower within said receptacle, a vertically-moving plate below said receptacle, and means for operating these parts, so as to cause the prepared material in the receptacle to be pressed out on the upward movement of the receptacle, and so as to detach the portions thus pressed out from the main body in the receptacle by the downward movement of the plate.

My invention also consists in certain devices for imparting the above-described movements, as fully set forth hereinafter, and as illustrated in the accompanying drawings, in which—

Figures 1, 2, and 3 are sectional views illustrating the arrangement and movements of the receptacle, follower, and receiving-plate. Fig. 4 is a sectional elevation showing one form of machine embodying my invention. Fig. 5 is a side elevation of said machine. Fig. 6 is a vertical section on the line 6 6, Fig. 4; and Figs. 7 and 8 are detail views of parts of the machine.

Heretofore machines for dropping candy have been provided with receptacles having perforated bottoms, through which the properly-prepared material has been caused to flow in streams corresponding in number to the perforations, and after a sufficient quantity has passed cutters have severed each stream of material, and the severed portions have been received upon a plate, after which the operation has been repeated.

In order to avoid the necessity of employing severing devices, as well as to attain other advantages, I make use of a receptacle 26, having a perforated bottom 70, the perforations 71 being preferably conical and contracting downward, and with an internal plate or follower 8, which is brought to bear upon the mass of material in the receptacle, and is forced downward at intervals upon the same, so as to force such material in streams downward through the openings, and I also use a plate or sheet 53, which, when the said material is forced out through the openings, occupies a position near to the bottom of the box, as shown in Fig. 1, and after a sufficient quantity of material has thus been pressed out the plate 53 and the box are suddenly separated by moving one or the other, or both, as shown in Fig. 2, until the particles of material, by their gravity and their greater adhesion to the plate 53, break away from the portions in the opening 71 and collect in separate bodies $x$ upon the plate. These parts may be combined in an operative machine with appliances of different construction that will impart to them the desired movements in proper time to produce the required effect.

I will now describe the construction of the machine which I have found to be practically operative. In said machine there is a table 2, supported by legs 82 and supporting at the top a frame 1, having seats or shoulders 25, upon which may rest the aforesaid receptacle 26, and above the table extends a cross-piece 3, supported by standards 4. In a central socket in the cross-piece 3 fits a flanged nut made in two sections, each bolted to the cross-piece, and through which passes an elevating-screw 5, loosely connected with the socket-piece 7 on the follower 8, and having at the upper end a hand-wheel 6. The said screw also passes through a perforation in a bevel-pinion 10, which turns between the top section of the stationary nut and a bracket 13, through which the screw extends, and which is provided with a feather 9, that extends into a groove 12 in the screw. On the revolution of the pinion in one direction or the other the screw is turned therewith in the stationary nut, and is raised or lowered, carrying with it the follower 8. The plate 53, which is below the perforated bottom 70 of the receptacle 26, is supported by a platform 51, which is secured to the upper end of a guided bar 49, the plate 53 being clamped to the platform 51 by means of side strips 52, each secured at one end to the platform and capable of being lifted therefrom at the other end to permit the insertion of the said plate 53. The bar 49 is connected to a treadle 55, by means of which it may be raised or lowered, and a spring 59 interposed between the table top 2, and an adjustable collar 58 upon the bar is compressed when the bar is raised and tends to throw the latter down when the foot is removed from the treadle. The bar 49 has a bend or offset 54 near the center to allow for the passage of a transverse shaft 36, which turns in suitable bearings upon the frame of the machine, and which constitutes the driving-shaft from which the various parts of the machine are operated, rotation being imparted thereto by a driving belt or chain 48, engaging with a pulley 47 upon the shaft. To a pendant 60, secured to the table top 2, is pivoted a lever 61, which is connected by a spring 63 with the inner end of the treadle 55, and a cam 64 upon the shaft 36 is arranged to come in contact with a pin 62, extending from the lever 61, so as to raise the said lever and treadle and with them the bar 49, platform 51, and plate 53, the motion, however, not being a positive one, inasmuch as the spring 63 will yield if there is any obstruction or resistance to the movement of the plate. An adjustable set-screw 65 passes through the bottom of the receptacle 26 in position to be engaged by the plate 53, thereby determining the extent to which the said plate shall approach the bottom of the receptacle. With the pinion 10 gears a pinion 17 upon the shaft 16, supported in bearings upon the cross-bar 3, and on the said shaft 16 turns loosely a toothed wheel 19, that engages with a guided rack 20, connected by a jointed connecting-rod 29 with the adjustable crank-pin 40 of a crank 38 upon the shaft 36. A pawl 23, carried by the toothed wheel 19, engages with the teeth of a ratchet-wheel 18, fixed to the shaft 16, so that when the rack 20 descends the shaft 16 will be turned to rotate the pinion 10, and thereby cause a slight descent of the screw 5 and follower 8, the reverse movement of the rack imparting no motion to the pinion or follower. Through guides upon the frame 1, at each side of the latter, pass two vertical lifting-rods 28 28, which are connected by a cross-bar 39, secured adjustably to said rods, and which extends above a cam 37 upon the shaft 36, so that the revolution of the said cam will raise the said lifting-rods at intervals, and with them the receptacle 26. Collars 31, adjustable upon the rods 28, come in contact with guides 33, through which the rods extend and serve to limit the descent of the rods.

The properly-prepared material is placed in the receptacle 26, the follower 8 is brought in position to rest upon the material, and upon the revolution of the shaft 36 the following movements will occur: The cams 37 will lift the receptacle 26, and thereby compress the material between the receptacle and the follower 8, causing portions of the same to exude through the openings 71. The revolution of the shaft 36 also brings the cam 64 in contact with the pin 62, lifting the treadle and the rod 49, together with the sheet 53, until the latter comes in contact with the set-screw 65, after which it will follow the receptacle 26 in its upward movement, the tension of the spring 63 holding the sheet against the set-screw and lifting it as the receptacle ascends. When the cam 64 passes from the pin 62, the plate 53 will suddenly descend under the action of the spring 59, and the particles of material upon the plate will be drawn and separated from the body of the material in the receptacle, as before described.

It will be seen that as the receptacle descends the nut 9 is turned so as to feed downward the screw 5 and follower 8, the object of this movement being to maintain the follower in such position as to confine the material in the receptacle 26 in a body that fills the entire space inclosed by the sides and bottom of the receptacle and the follower 8, but without pressing the said material through the perforations 71. When, however, the receptacle is lifted by the action of the cams 37, the follower 8 remains stationary and a certain portion of material is forced out of the perforations, the amount depending upon the extent to which the receptacle is raised or the position of the follower 8 before the receptacle begins to rise.

The extent to which the follower 8 is fed downward will depend upon the throw of the rack 20, which is regulated by adjusting the crank-pin 40 upon the crank 38.

Without limiting myself to the precise construction and arrangement of parts shown, I claim—

1. In a machine for dropping candy, the combination, with the stationary frame, of a movable receptacle having a perforated bottom, a movable receiving-plate below the receptacle, an adjustable follower in the receptacle, an intermittingly-operated driver for the follower, and a shaft connected to intermittingly operate the receptacle and the plate, substantially as set forth.

2. The combination, in a machine for dropping candy, of a vertically-movable receptacle having a perforated bottom, a follower within the receptacle, a plate below the receptacle, vertically movable toward and from the receptacle, a driver for intermittingly moving the follower, and a shaft connected with the receptacle and with the plate for raising and lowering them independently of the follower, substantially as set forth.

3. The combination, with the receptacle 26, of a follower, a slotted feeding-screw and driving-pinion, a fixed nut adapted to said screw, a shaft gearing with said pinion and provided with a ratchet engaging with a pawl carried by a toothed wheel upon said shaft, and a reciprocating rack engaging with said toothed wheel, a crank-shaft connected with said rack and provided with cams and connections for elevating and lowering the receptacle, substantially as set forth.

4. The combination, with the receptacle 26, having a perforated bottom, of a plate 53, a supporting-rod 49, connected with the plate, a lever connected with said rod through the medium of a spring, and a revolving cam bearing upon said lever, substantially as set forth.

5. The combination of a reciprocating receptacle having a perforated bottom, a reciprocating receiving-plate having a movement greater than the movement of the receptacle, a stop for the plate carried by the receptacle, a lifting-bar connected with the receiving-plate, a driving-shaft, and yielding connections between the driving-shaft and the said bar, substantially as and for the purpose set forth.

6. The combination of the vertically-movable receptacle, the plate 51, supporting-bar 49, a lever connected to said bar by a spring, and a shaft provided with a cam arranged to engage with said lever, substantially as set forth.

In testimony whereof I have signed my name to this specification in the presence of two subscribing witnesses.

JOHN SMITH.

Witnesses:
S. SPENCER CHAPMAN,
NATHAN C. LANE.